United States Patent
Naruse et al.

(10) Patent No.: US 11,437,945 B2
(45) Date of Patent: Sep. 6, 2022

(54) MOTOR-DRIVEN COMPRESSOR

(71) Applicant: KABUSHIKI KAISHA TOYOTA JIDOSHOKKI, Kariya (JP)

(72) Inventors: Takuya Naruse, Kariya (JP); Kazuki Najima, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 16 days.

(21) Appl. No.: 17/189,451

(22) Filed: Mar. 2, 2021

(65) Prior Publication Data

US 2021/0281201 A1 Sep. 9, 2021

(30) Foreign Application Priority Data

Mar. 6, 2020 (JP) .............................. JP2020-038800

(51) Int. Cl.
| | |
|---|---|
| *H02P 21/00* | (2016.01) |
| *H02P 21/22* | (2016.01) |
| *F25B 31/02* | (2006.01) |
| *H02P 27/12* | (2006.01) |
| *H02P 21/18* | (2016.01) |

(52) U.S. Cl.
CPC ............ *H02P 21/22* (2016.02); *F25B 31/026* (2013.01); *H02P 21/18* (2016.02); *H02P 27/12* (2013.01)

(58) Field of Classification Search
CPC .......... H02P 21/22; H02P 21/18; H02P 27/12; H02P 27/06; F25B 31/026
See application file for complete search history.

(56) References Cited

FOREIGN PATENT DOCUMENTS

| JP | 2017-184594 A | 10/2017 |
|---|---|---|
| KR | 20120036246 A * | 4/2012 |

* cited by examiner

*Primary Examiner* — Karen Masih (57) ABSTRACT

The motor-driven compressor includes an electric motor, a housing, a compression portion, and an inverter device. The inverter device includes an inverter circuit, a current sensor, a coordinate converter, a speed controller, a current controller, a PWM controller, and a rotation angle estimator. The speed controller generates a d-axis current command value and a q-axis current command value such that a necessary torque to drive the electric motor occurs. The inverter device includes a heat-generating current command section that increases a temperature of the electric motor by changing the d-axis current command value and the q-axis current command value. The heat-generating current command section changes the d-axis current command value and the q-axis current command value so as to shift them in a direction in which a d-axis current value increases along a constant torque curve in a d-q coordinate system.

3 Claims, 12 Drawing Sheets

Fig.16

MOTOR-DRIVEN COMPRESSOR

BACKGROUND

1. Field

The present disclosure relates to a motor-driven compressor.

2. Description of Related Art

Vehicles, such as electric vehicles, are equipped with a vehicle air conditioning system. In the refrigeration cycle of the vehicle air conditioning system, a motor-driven compressor may be used. The motor-driven compressor includes a compression portion that is driven by an electric motor. To control the electric motor with an inverter, vector control may be executed. For example, refer to Japanese Laid-Open Patent Publication No. 2017-184594.

A known technique is used to operate a refrigeration device as a heating device, such as a heat pump or a hot gas heater, by switching part of a refrigerant passage in the refrigeration device. In such a heating device, it is desired that the heater start to work in a shorter period of time. To achieve this, it is effective to quickly increase the temperature of a refrigerant using the motor-driven compressor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an objective of the present disclosure is to provide a motor-driven compressor capable of quickly heating a refrigerant.

A motor-driven compressor that solves the above-described objective includes an electric motor, a housing that accommodates the electric motor and includes a suction port into which a refrigerant is drawn, a compression portion configured to be driven by the electric motor and configured to draw in and compress the refrigerant in the housing, and an inverter device configured to drive the electric motor. The inverter device includes an inverter circuit including switching elements included in upper arms and lower arms of u-, v-, w-phases, the inverter circuit being configured to convert direct-current voltage into alternating-current voltage when switching operation for the switching elements is performed and supply the alternating-current voltage to the electric motor, a current sensor configured to detect a value of current supplied to the electric motor, a coordinate converter configured to calculate a d-axis current value and a q-axis current value using a detected value of the current sensor, a speed controller configured to generate a d-axis current command value and a q-axis current command value using a difference between a rotation speed command value and a rotation speed estimated value for the electric motor, a current controller configured to calculate a d-axis voltage command value using a difference between the d-axis current command value and the d-axis current value and calculate a q-axis voltage command value using a difference between the q-axis current command value and the q-axis current value, a pulse-width-modulation controller configured to control the switching elements using the d-axis voltage command value and the q-axis voltage command value, and a rotation speed estimator configured to calculate the rotation speed estimated value using the d-axis current value, the q-axis current value, the d-axis voltage command value, and the q-axis voltage command value. The speed controller generates the d-axis current command value and the q-axis current command value such that necessary torque to drive the electric motor occurs. The inverter device includes a heat-generating current command section configured to increase a temperature of the electric motor by changing the d-axis current command value and the q-axis current command value. The heat-generating current command section is configured to change the d-axis current command value and the q-axis current command value so as to shift the d-axis current command value and the q-axis current command value in a direction in which the d-axis current value increases along a constant torque curve in a d-q coordinate system.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle on-board motor-driven compressor 20 according to an embodiment of the present disclosure will now be described.

The vehicle on-board motor-driven compressor 20 of the present embodiment is used in a vehicle air conditioner 10. In the vehicle on-board motor-driven compressor 20, a heat pump mode is employed. The heat pump mode includes a refrigeration cycle in which a refrigerant circulates. In this cycle, an evaporator, the vehicle on-board motor-driven compressor 20, a condenser, and an expansion valve are used. The evaporator causes the refrigerant to be heated by external air and to become vaporized. The vaporized refrigerant is compressed by the vehicle on-board motor-driven compressor 20. Subsequently, the condenser liquefies the refrigerant and heats the air. Then, in the expansion valve, the pressure of the refrigerant decreases and the temperature of the refrigerant decreases. In the refrigeration cycle, the evaporator absorbs the heat from the external air, thereby increasing the temperature of the refrigerant. This allows the refrigerant to heat the passenger compartment through heat exchange with the indoor air by the condenser.

Figure 1:
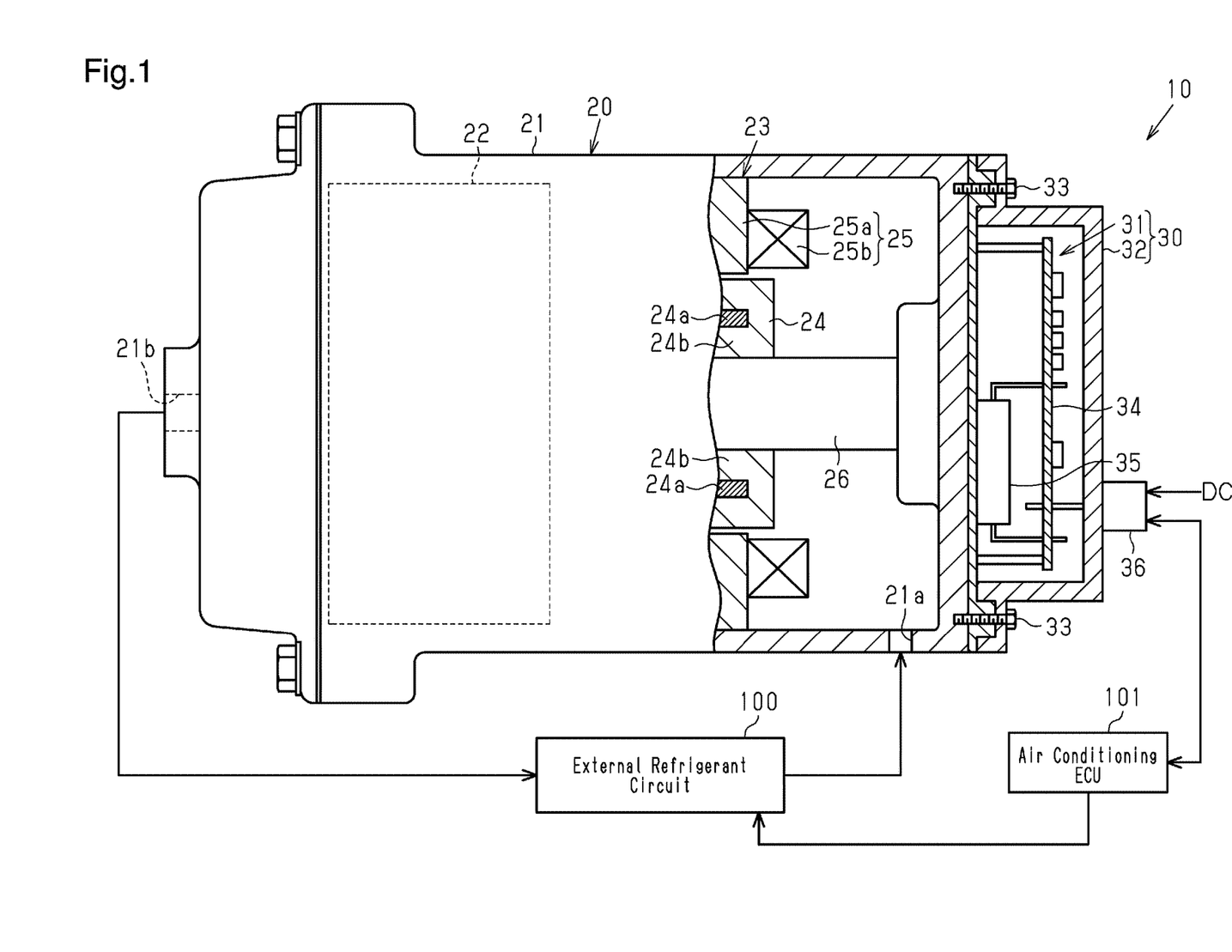
FIG. 1 is a partial cutaway diagram schematically showing a vehicle on-board motor-driven compressor according to an embodiment.

As shown in FIG. 1, the vehicle air conditioner 10 includes the vehicle on-board motor-driven compressor 20 and an external refrigerant circuit 100, which supplies a refrigerant to the vehicle on-board motor-driven compressor 20. The external refrigerant circuit 100 includes devices such as the evaporator, the condenser, and the expansion valve. The vehicle on-board motor-driven compressor 20 compresses the refrigerant, and the external refrigerant circuit 100 performs heat exchange of the refrigerant and expands the refrigerant. This allows the passenger compartment to be cooled and heated.

The vehicle air conditioner 10 includes an air conditioning ECU 101, which controls the entire vehicle air conditioner 10. The air conditioning ECU 101 is capable of obtaining parameters such as the temperature of the passenger compartment and a setting temperature. Based on these parameters, the air conditioning ECU 101 outputs various commands such as an ON-OFF command to the vehicle on-board motor-driven compressor 20.

The vehicle on-board motor-driven compressor 20 includes a housing 21, a compression portion 22, and an electric motor 23. The housing 21 includes a suction port 21a, into which a refrigerant is drawn from the external refrigerant circuit 100. The compression portion 22 and the electric motor 23 are accommodated in the housing 21.

The entire housing 21 is substantially cylindrical. The housing 21 includes a discharge port 21b, out of which a refrigerant is discharged.

The compression portion 22 draws in and compresses the refrigerant in the housing 21, and discharges the compressed refrigerant out of the discharge port 21b. The compression portion 22 may be of any type such as a scroll type, a piston type, and a vane type. The specific structure of the compression portion 22 may be changed according to the type.

The electric motor 23 is a three-phase motor and is configured to drive the compression portion 22. The electric motor 23 includes a columnar rotary shaft 26, which is rotationally supported by the housing 21, a cylindrical rotor 24, which is fixed to the rotary shaft 26, and a stator 25, which is fixed to the housing 21. The rotor 24 includes a cylindrical rotor core 24b, in which magnets 24a are embedded. The magnets 24a are permanent magnets. The axis of the rotary shaft 26 coincides with the axis of the cylindrical housing 21. The stator 25 includes a cylindrical stator core 25a and coils 25b, which are wound around the teeth of the stator core 25a. The rotor 24 and the stator 25 are faced with each other in the radial direction of the rotary shaft 26.

The vehicle on-board motor-driven compressor 20 includes an inverter unit 30. The inverter unit 30 includes an inverter device 31, which is configured to drive the electric motor 23, and a case 32, which accommodates the inverter device 31. The coils 25b of the electric motor 23 are electrically connected to the inverter device 31. The case 32 is fixed to the housing 21 by bolts 33, which serve as fasteners. That is, the vehicle on-board motor-driven compressor 20 of the present embodiment is integrated with the inverter device 31.

The inverter device 31 includes a circuit board 34 and a power module 35, which is electrically connected to the circuit board 34. Various types of electronic components are mounted on the circuit board 34. The outer surface of the case 32 is provided with a connector 36. The circuit board 34 and the connector 36 are electrically connected to each other. The inverter device 31 is supplied with power via the connector 36. Further, the air conditioning ECU 101 and the inverter device 31 are electrically connected to each other.

Thus, in the vehicle on-board motor-driven compressor 20, the housing 21 accommodates the compression portion 22 and the electric motor 23, which drives the compression portion 22. The vehicle on-board motor-driven compressor 20 is integrated with the inverter device 31, which supplies the motor 23 with power. When the electric motor 23 drives the compression portion 22, a refrigerant is drawn from the suction port 21a into the housing 21. Subsequently, the refrigerant flows in the axial direction of the rotary shaft 26 and is then drawn through the electric motor 23 into the compression portion 22. After being compressed by the compression portion 22, the refrigerant is discharged out of the discharge port 21b. When the refrigerant flows through the housing 21, heat can be exchanged between the electric motor 23 and the refrigerant.

Figure 2:
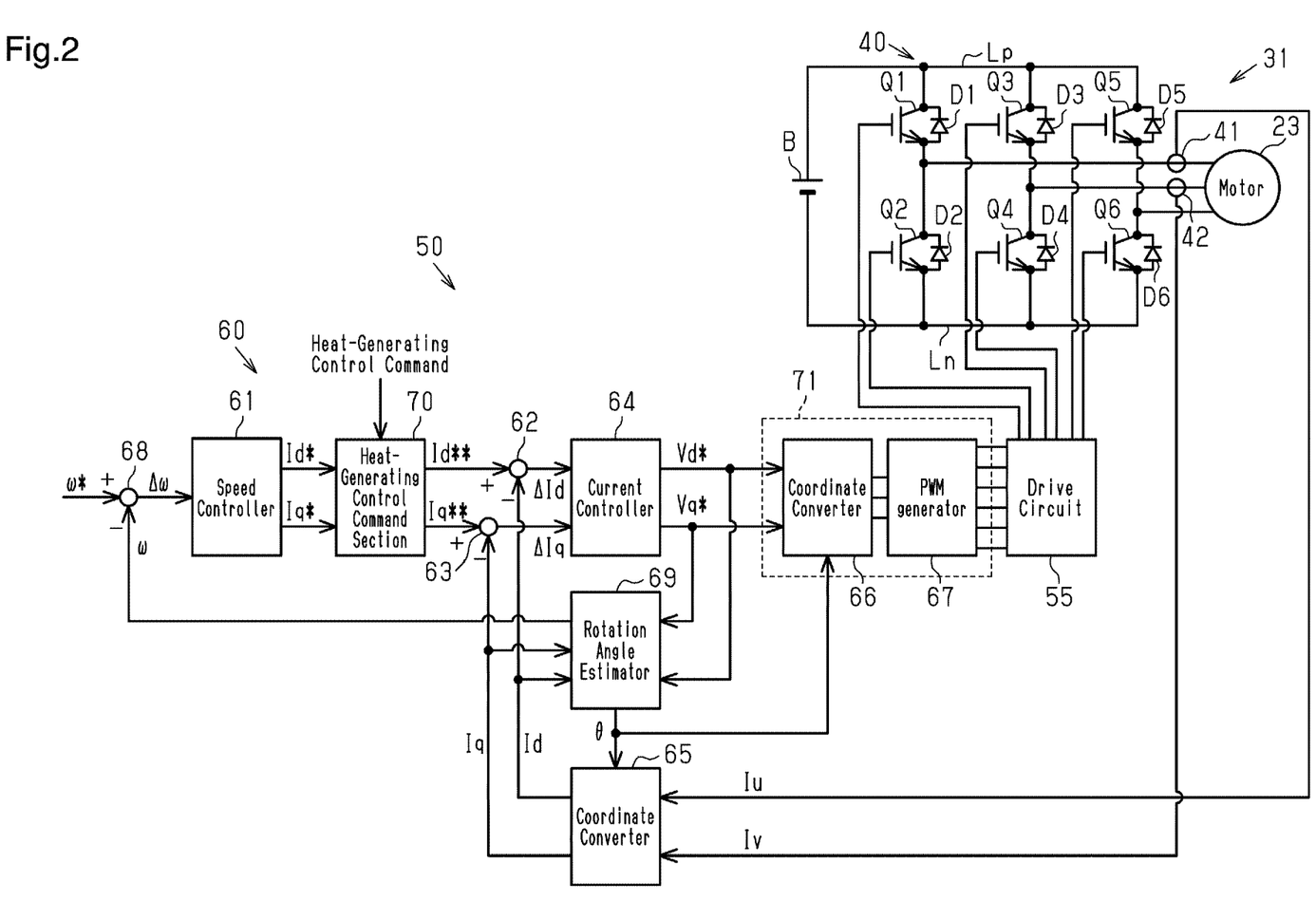
FIG. 2 is a block diagram showing the configuration of the inverter device.

As shown in FIG. 2, the inverter device 31 includes an inverter circuit 40 and an inverter control device 50. The inverter control device 50 includes a drive circuit 55 and a controller 60.

The inverter circuit 40 includes six switching elements Q1 to Q6 and six diodes D1 to D6. Insulated gate bipolar transistors (IGBTs) are used as the switching elements Q1 to Q6. The switching element Q1, which is included in a u-phase upper arm, and the switching element Q2, which is included in a u-phase lower arm, are connected in series between a positive electrode bus bar Lp and a negative electrode bus bar Ln. The switching element Q3, which is included in a v-phase upper arm, and the switching element Q4, which is included in a v-phase lower arm, are connected in series between the positive electrode bus bar Lp and the negative electrode bus bar Ln. The switching element Q5, which is included in a w-phase upper arm, and the switching element Q6, which is included in a w-phase lower arm, are connected in series between the positive electrode bus bar Lp and the negative electrode bus bar Ln. The diodes D1 to D6 are connected in antiparallel to the switching elements Q1 to Q6, respectively. Battery B, which serves as a direct-current power supply, is connected to the positive electrode bus bar Lp and the negative electrode bus bar Ln.

A portion where the switching element Q1 and the switching element Q2 are connected is connected to the u-phase terminal of the electric motor 23. A portion where the switching element Q3 and the switching element Q4 are connected is connected to the v-phase terminal of the electric motor 23. A portion where the switching element Q5 and the switching element Q6 are connected is connected to the w-phase terminal of the electric motor 23. The inverter circuit 40 with the switching elements Q1 to Q6, which are included in the upper arms and lower arms, is configured to convert direct-current voltage (the voltage at the battery B) into alternating-current voltage when switching operation for the switching elements Q1 to Q6 is performed and supplies the alternating-current voltage to the electric motor 23.

Each of the switching elements Q1 to Q6 includes a gate terminal to which the drive circuit 55 is connected. Using control signals, the drive circuit 55 performs switching operation for the switching elements Q1 to Q6 of the inverter circuit 40.

A current sensor 41 is provided between the portion connecting the two u-phase switching elements Q1, Q2 and the u-phase terminal of the electric motor 23. A current sensor 42 is provided between the portion connecting the two v-phase switching elements Q3, Q4 and the v-phase terminal of the electric motor 23. In this manner, the inverter device 31 includes the current sensors 41, 42, which detect the value of current supplied to the electric motor 23.

In the present embodiment, a rotation position sensor is not used. That is, the present embodiment eliminates the use of a position sensor. An estimated rotation angle θ (rotation position) of the electric motor 23 is calculated by a rotation angle estimator 69 (described later) from a d-axis current value Id and a q-axis current value Iq and from a d-axis voltage command value Vd* and a q-axis voltage command value Vq*. The d-axis current and the q-axis current flow through the electric motor 23. The d-axis includes the direction of current in which magnetic flux is generated in the same direction as the magnetic flux produced by the permanent magnets in the electric motor 23. The q-axis includes a direction in which the q-axis is advanced by π/2 from the d-axis.

The controller 60 includes a speed controller 61, subtractors 62, 63, 68, a current controller 64, a coordinate converter 65 (three-phase-to-two-phase converter), a coordinate converter 66 (two-phase-to-three-phase converter), a pulse-width-modulation (PWM) generator 67, the rotation angle estimator 69, which serves as a rotation speed estimator that calculates a rotation speed estimated value, and a heat-generating current command section 70. The coordinate converter 66 (two-phase-to-three-phase converter) and the PWM generator 67 compose a PWM controller 71, which controls the switching elements Q1 to Q6 using the d-axis voltage command value Vd* and the q-axis voltage command value Vq*.

The coordinate converter 65 detects a u-phase current Iu and a v-phase current Iv, which flow through the electric motor 23, from current detected values obtained by the current sensors 41, 42, and also detects a w-phase current Iw, which flows through the electric motor 23. Further, the coordinate converter 65 uses the u-phase current Iu, the v-phase current Iv, the w-phase current Iw, and an estimated rotation angle θ (rotation position) of the electric motor 23 calculated by the rotation angle estimator 69, to convert the u-phase current Iu, the v-phase current Iv, and the w-phase current Iw into a d-axis current value Id (excitation component current) and a q-axis current value Iq (torque component current). That is, the coordinate converter 65 uses the detected values of the current sensors 41, 42 to calculate the d-axis current value Id and the q-axis current value Iq. The d-axis current value Id (excitation component current) is a current vector component that generates a field in the current flowing through the electric motor 23. The q-axis current value Iq (torque component current) is a current vector component that generates torque in the current flowing through the electric motor 23.

The subtractor 68 calculates a difference Δω between a rotation speed command value ω* for the electric motor 23, which is received from the air conditioning ECU 101 (upper ECU), and an estimated rotation speed ω, which serves as a rotation speed estimated value. The estimated rotation speed ω is obtained using an estimated rotation speed, which is computed by the rotation angle estimator 69.

The speed controller 61 calculates the d-axis current command value Id* and the q-axis current command value Iq* such that the difference Δω between the rotation speed command value ω*, which is received from an external device, and the estimated rotation speed ω becomes 0. That is, the speed controller 61 uses the difference Δω between the rotation speed command value ω* for the electric motor 23 and the estimated rotation speed ω, which serves as the rotation speed estimated value, to generate the d-axis current command value Id* and the q-axis current command value Iq*.

The heat-generating current command section 70 processes the d-axis current command value Id* and outputs it as a d-axis current command value Id**. Further, the heat-generating current command section 70 outputs the q-axis current command value Iq* and outputs it as a q-axis current command value Iq**. The details will be described later.

The subtractor 62 calculates a difference ΔId between the d-axis current command value Id and the d-axis current value Id. The subtractor 63 calculates a difference ΔIq between the q-axis current command value Iq and the q-axis current value Iq. The current controller 64 uses the difference ΔId and the difference ΔIq to calculate the d-axis voltage command value Vd* and the q-axis voltage command value Vq*. That is, the current controller 64 uses the difference ΔId between the d-axis current command value Id** and the d-axis current value Id to calculate the d-axis voltage command value Vd*, and uses the difference ΔIq between the q-axis current command value Iq** and the q-axis current value Iq to calculate the q-axis voltage command value Vq*. The coordinate converter 66 uses the rotation angle θ (rotation position) of the electric motor 23, which is calculated by the rotation angle estimator 69, to convert the d-axis voltage command value Vd* and the q-axis voltage command value Vq* into voltage command values Vu, Vv, Vw, which are voltages applied to the electric motor 23.

The PWM generator 67 normalizes the voltage command values Vu, Vv, Vw with the power supply voltage value of the inverter. Based on the result of comparison with a triangular wave, the PWM generator 67 outputs PWM control signals to turn on or off the switching elements Q1 to Q6 of the inverter circuit 40.

That is, the controller 60 uses the currents iu, iv, iw of the u-, w-, v-phases flowing through the electric motor 23 to control the switching elements Q1 to Q6, which are arranged on the current path of the electric motor 23, such that the rotation speed of the electric motor 23 becomes a target value. The signals from the PWM generator 67 are sent to the drive circuit 55.

The rotation angle estimator 69 uses the d-axis current value Id, the q-axis current value Iq, the d-axis voltage command value Vd*, and the q-axis voltage command value Vq* to compute (i.e., estimate) the estimated rotation angle θ and the estimated rotation speed ω (estimated angle speed) of the electric motor 23.

Figure 4A:
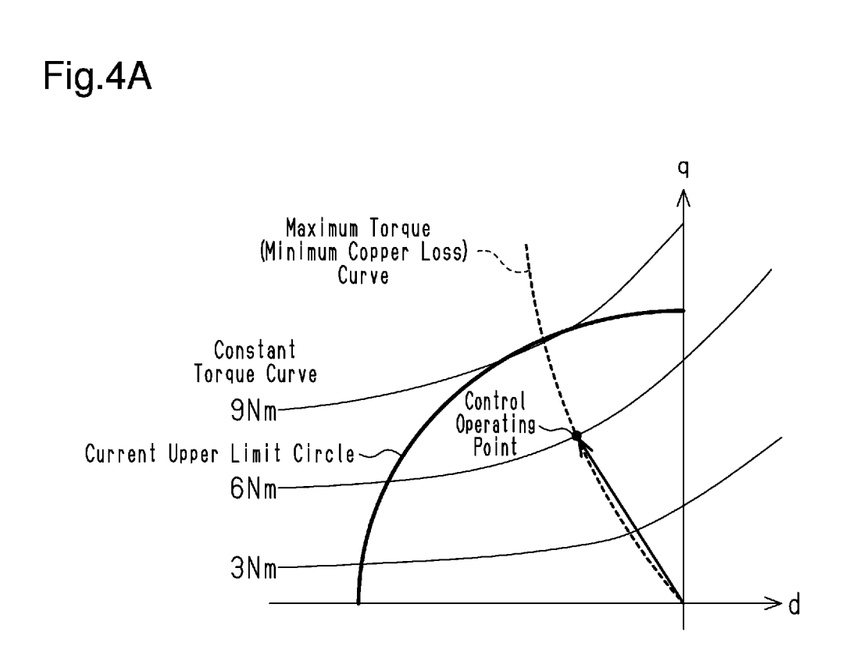
FIG. 4A is a diagram illustrating the control current vector.

Referring to FIG. 4A, the above-described speed controller 61 generates the d-axis current command value Id* and the q-axis current command value Iq* such that a necessary torque to drive the electric motor 23 occurs. That is, the speed controller 61 generates the d-axis current command value Id* and the q-axis current command value Iq* on a control operating point corresponding to the load torque on a maximum torque (minimum copper loss) curve.

When the external air temperature is low, absorbing heat from external air is difficult in the heat pump. Thus, the heat-generating current command section 70, which is located downstream of the speed controller 61, executes the processes shown in FIG. 3 in order to expedite the heating of the passenger compartment. Specifically, the heat-generating current command section 70 discharges heat with the electric motor 23 and heats a refrigerant in order to expedite the heating of the passenger compartment. Even if a hot gas heater is employed, the heat-generating current command section 70 executes the same processes as those when the heat pump is employed, and causes the electric motor 23 to discharge heat and heat a refrigerant in order to expedite the heating of the passenger compartment.

The heat-generating current command section 70 in the inverter device 31 increases the temperature of the electric motor 23 by changing the d-axis current command value Id* and the q-axis current command value Iq*. The heat-generating current command section 70 changes the d-axis current command value Id* and the q-axis current command value Iq* so as to shift them in a direction in which the d-axis current value Id increases along the constant torque curve in the d-q coordinate system shown in FIG. 5.

Figure 3:
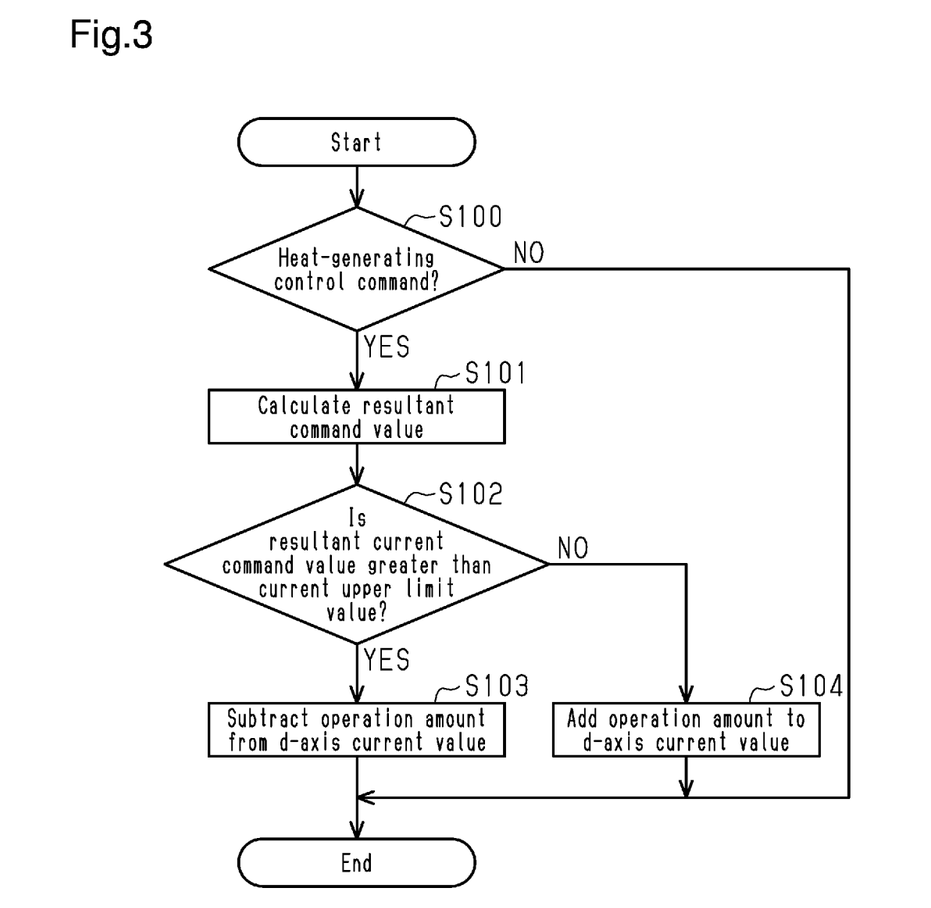
FIG. 3 is a flowchart illustrating the operation of the present embodiment.

In FIG. 3, the heat-generating current command section 70 determines in step S100 whether a heat-generating control command has been issued from the air conditioning ECU 101 (upper ECU), i.e., whether a command of heating a refrigerant, which serves as a refrigerant temperature-increasing command, has been issued from an external device. When the heat-generating control command (the command of heating the refrigerant) has been issued, the heat-generating current command section 70 changes the d-axis current command value and the q-axis current command value as described below. Thus, as shown in FIG. 5, the heat-generating current command section 70 generates the d-axis current command value and the q-axis current command value, from the control operating point, on the intersection point of the constant torque curve and an upper limit circle on a strengthened field side.

First, the heat-generating current command section 70 proceeds from step S100 to step S101 in FIG. 3 to calculate a resultant current command value. Then, if the resultant current command value is separate from the current upper limit value, the heat-generating current command section 70 determines in step S102 whether the resultant current command value is greater than a current upper limit value. When the resultant current command value is not greater than the current upper limit value, the heat-generating current command section 70 adds an operation amount to the d-axis current value in step S104. When the resultant current command value is greater than the current upper limit value, the heat-generating current command section 70 subtracts the operation amount from the d-axis current value in step S103.

Figure 5:
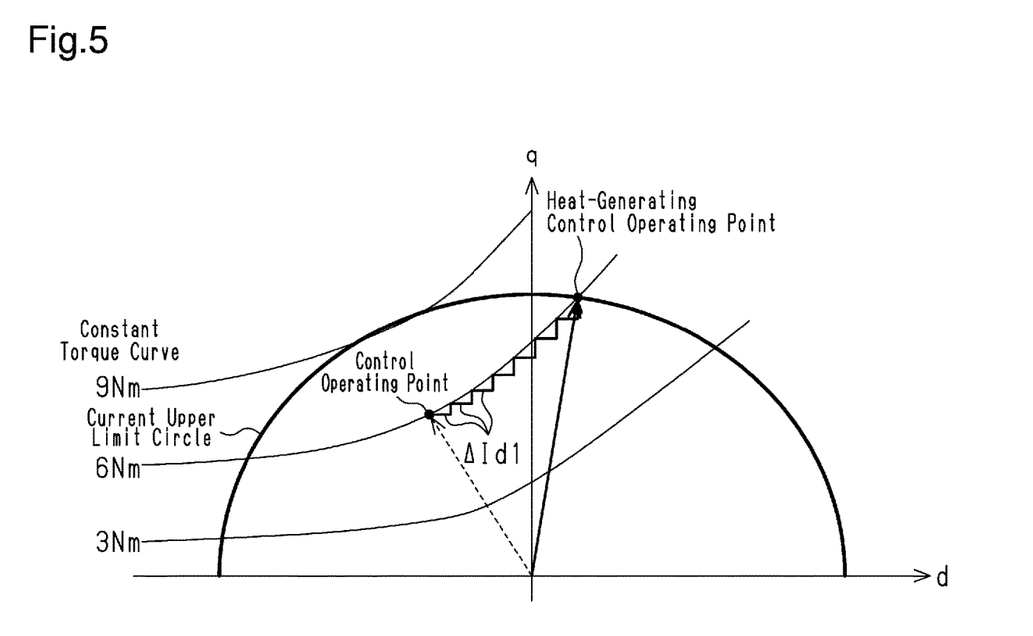
FIG. 5 is diagram of the control current vector, illustrating shifts of heat-generating current increase.

Referring to FIG. 5, the heat-generating current command section 70 increases heat-generating current and shifts the control operating point to a heat-generating control operating point such that the electrical energy is converted into thermal energy resulting from copper loss and core loss. Thus, the heat-generating current command section 70 generates the d-axis current command value and the q-axis current command value, from the control operating point, on the intersection point of the constant torque curve and the upper limit circle on the strengthened field side.

More specifically, in step S101 of FIG. 3, the heat-generating current command section 70 calculates a resultant current command value Ic* from the d-axis current command value Id* and the q-axis current command value Iq* using the following equation (1).

$$Ic^* = \sqrt{Id^{*2} + Iq^{*2}} \qquad (0.1)$$

In step S103 of FIG. 3, based on the d-axis current command value Id*, the heat-generating current command section 70 updates the d-axis current command value Id* by an amount corresponding to the d-axis current command value Id1* in FIG. 5 using the following equation (2)

$$Id^*fr = Id^*ba - \Delta Id1 \qquad (2)$$

In equation (2), Id*ba is the d-axis current command value prior to being updated, and Id*fr is the d-axis current command value subsequent to being updated.

In step S104 of FIG. 3, based on the d-axis current command value Id*, the heat-generating current command section 70 updates the d-axis current command value Id* by an amount corresponding to the d-axis current command value Id1* in FIG. 5 using the following equation (3).

$$Id^*fr = Id^*b + \Delta Id1 \qquad (3)$$

In equation (3), Id*ba is the d-axis current command value prior to being updated, and Id*fr is the d-axis current command value subsequent to being updated.

When the heat-generating current command section 70 repeats step S100, step S101, step S102, and step S104 of FIG. 3 in this order, the operating point shifts from the control operating point to the heat-generating control operating point on the maximum torque curve in FIG. 5. After the operating point shifts from the control operating point to the heat-generating control operating point on the maximum torque curve in FIG. 5, the heat-generating current command section 70 repeats step S100, step S101, step S102, and step S103 of FIG. 3 in this order and repeats step S100, step S101, step S102, and step S104 of FIG. 3 in this order.

At this time, the rotation speed control is executed with a q-axis current command computed by a conventional speed controller, and current is supplied in the d-axis such that the difference between the upper limit current value and the q-axis current command value becomes zero.

The electric motor 23, which is used for a motor-driven compressor, is cooled by a refrigerant. When control is performed to increase the loss in the electric motor 23, the refrigerant is quickly heated. Thus, the passenger compartment starts to be heated in a shorter period of time. That is, the heating of the passenger compartment is expedited when the vehicle air conditioner 10 at a low temperature is started.

Figure 4B:
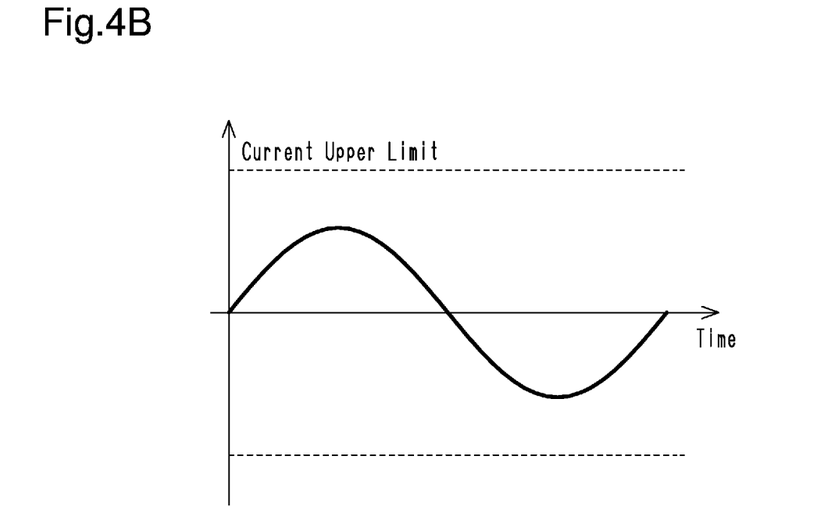
FIG. 4B is a current waveform chart.

A maximum torque control is employed as a control mode used for the vehicle on-board motor-driven compressor 20. As shown in FIGS. 4A and 4B, the maximum torque control is to perform control at a phase with a minimum motor current for the torque necessary for motor operation. This minimizes the copper loss that is to be generated. Thus, waste heat used to heat a refrigerant cannot be gained.

Motor loss includes copper loss and core loss. Copper loss occurs due to coil resistance and current of the motor. Core loss is determined by hysteresis loss and eddy-current loss. Hysteresis loss occurs due to changes in the magnetic resistance and magnetic flux in the core. Eddy-current loss occurs due to the electrical resistance of the core and the eddy currents produced in the core.

In the present embodiment, as shown in FIG. 2, the heat-generating current command section 70 (efficiency deterioration current command section) is provided downstream of the speed controller 61.

Figure 6A:
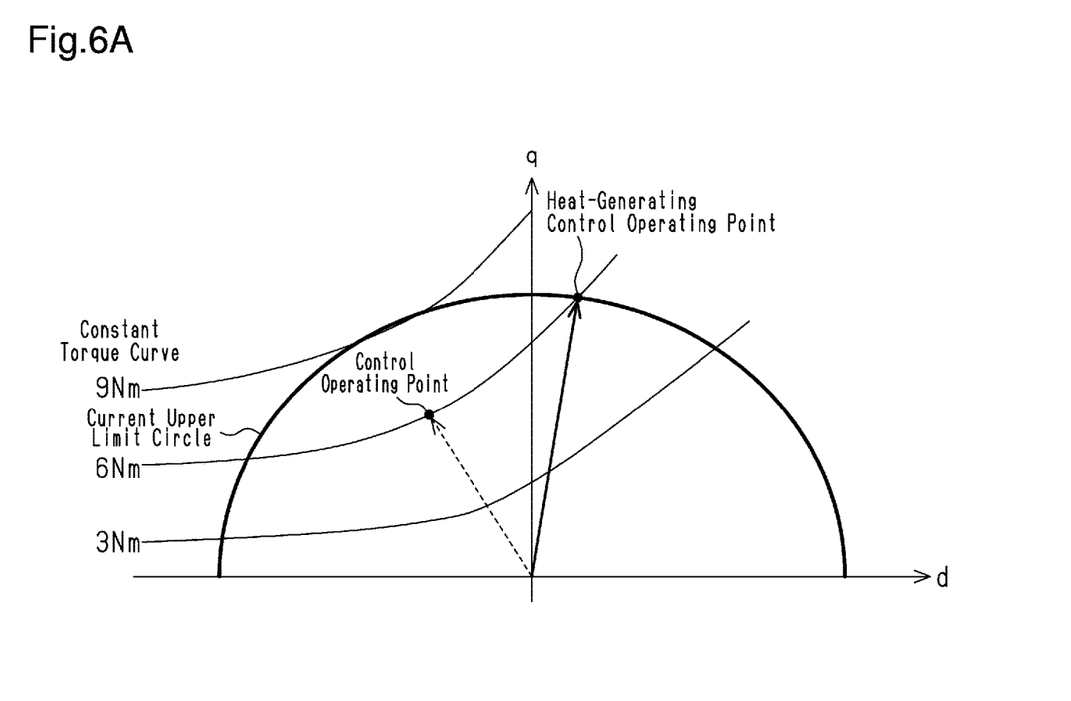
FIG. 6A is a diagram illustrating the control current vector.
Figure 6B:
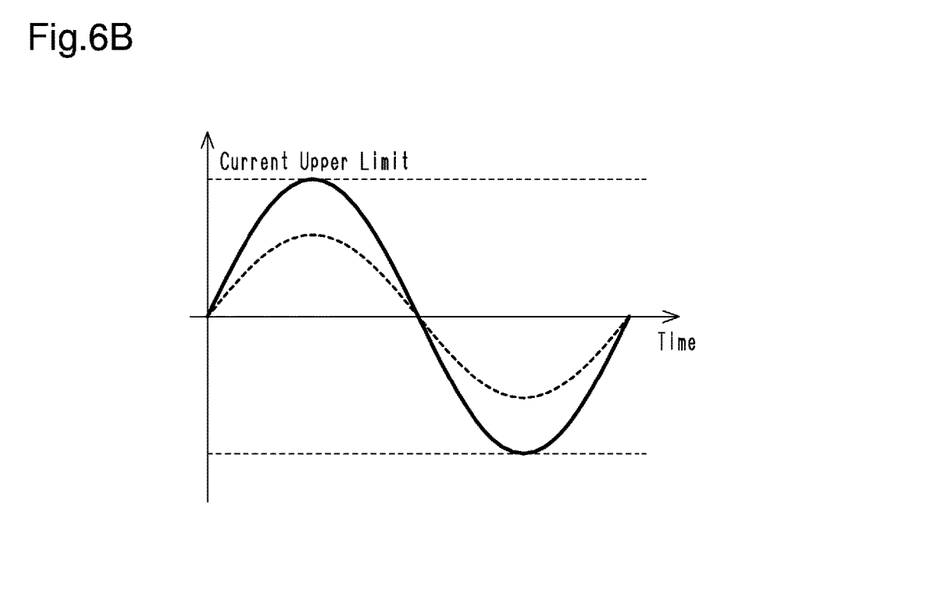
FIG. 6B is a current waveform chart.

As shown in FIG. 6A, the intersection point of the constant torque curve and the current upper limit circle (field strengthening direction) is used as the control operating point. Thus, the motor current becomes larger as shown by the solid line in FIG. 6B than the motor current in the minimum copper loss as shown by the broken line in FIG. 6B. This worsens the copper loss. That is, as shown in FIGS. 6A and 6B, an increase in the motor current worsens the copper loss.

Figure 7:
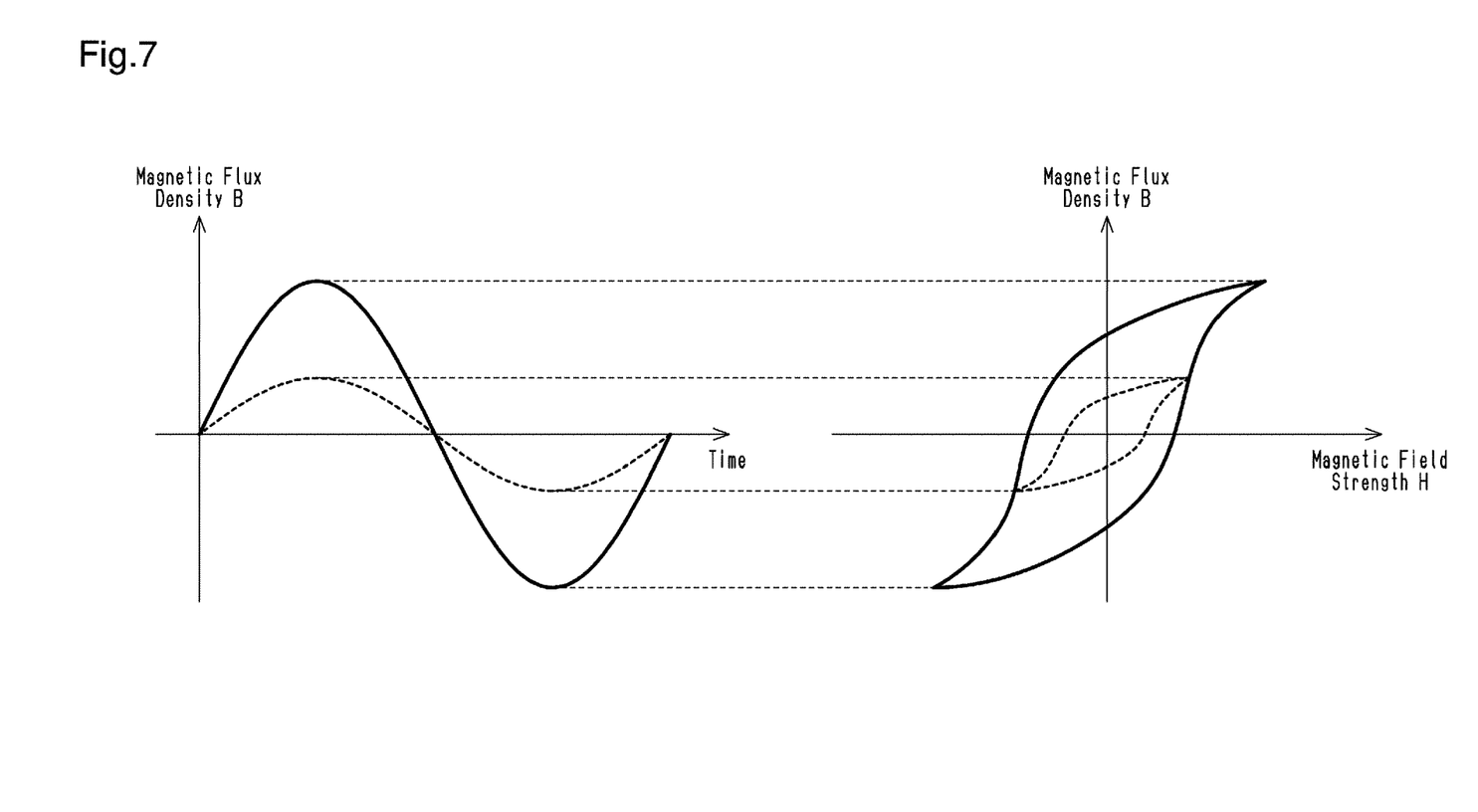
FIG. 7 is a diagram showing a B-H curve.

Further, when the intersection point of the constant torque curve and the current upper limit circle on the strengthened field side is used as the control operating point, the core loss (hysteresis loss) deteriorates as the BH curve area increases due to an increase in the magnetic flux density as shown by the solid line in FIG. 7, as compared with when the maximum torque control shown by the broken line in FIG. 7 is performed. This allows waste heat to be gained.

That is, as shown in FIG. 7, when current is supplied to the strengthened field side to increase the magnetic flux density of the core, the BH curve area increases. This worsens the core loss (hysteresis loss).

The above-described embodiment provides the following advantage.

(1) The vehicle on-board motor-driven compressor 20, which serves as the motor-driven compressor, includes the electric motor 23, the housing 21, the compression portion 22, and the inverter device 31. The housing 21 accommodates the electric motor 23 and includes the suction port 21a, into which a refrigerant is drawn. The compression portion 22 is configured to be driven by the electric motor 23 and is configured to draw in and compress the refrigerant in the housing 21. The inverter device 31 is configured to drive the electric motor 23. The inverter device 31 includes the inverter circuit 40, the current sensors 41, 42, the coordinate converter 65, the speed controller 61, the current controller 64, the PWM controller 71, and the rotation angle estimator 69. The inverter circuit 40 includes the switching elements Q1 to Q6, which are included in the upper arms and the lower arms of u-, v-, w-phases. The inverter circuit 40 is configured to convert direct-current voltage into alternating-current voltage when switching operation for the switching elements Q1 to Q6 is performed and supply the alternating-current voltage to the electric motor 23. The current sensors 41, 42 are configured to detect the value of current supplied to the electric motor 23. The coordinate converter 65 is configured to calculate the d-axis current value Id and the q-axis current value Iq using the detected values of the current sensors 41, 42. The speed controller 61 is configured to generate the d-axis current command value Id* and the q-axis current command value Iq* using the difference $\Delta\omega$ between the rotation speed command value $\omega^*$ for the electric motor 23 and the estimated rotation speed $\omega$, which serves as the rotation speed estimated value. The current controller 64 is configured to calculate the d-axis voltage command value Vd* using the difference $\Delta$Id between the d-axis current command value Id* and the d-axis current value Id, and calculate the q-axis voltage command value Vq* using the difference $\Delta$Iq between the q-axis current command value Iq* and the q-axis current value Iq. The PWM controller 71 is configured to control the switching elements Q1 to Q6 using the d-axis voltage command value Vd* and the q-axis voltage command value Vq*. The rotation angle estimator 69, which serves as the rotation speed estimator, is configured to calculate the estimated rotation speed $\omega$, which serves as the rotation speed estimated value using the d-axis current value Id, the q-axis current value Iq, the d-axis voltage command value Vd*, and the q-axis voltage command value Vq*. The speed controller 61 is configured to generate the d-axis current command value Id* and the q-axis current command value Iq* such that the necessary torque to drive the electric motor 23 occurs. The inverter device 31 includes the heat-generating current command section 70, which is configured to increase the temperature of the electric motor 23 by changing the d-axis current command value Id* and the q-axis current command value Iq*. The heat-generating current command section 70 is configured to change the d-axis current command value Id* and the q-axis current command value Iq* so as to shift them in the direction in which the d-axis current value Id increases along the constant torque curve in the d-q coordinate system.

Thus, when the heat-generating current command section 70 receives the refrigerant temperature-increasing command from an external device, the switching elements Q1 to Q6 are controlled using the d-axis current command value Id and the q-axis current command value Iq that shift in the direction in which the d-axis current value Id increases along the constant torque curve in the d-q coordinate system. Thus, the control to increase the loss of the electric motor 23 is performed to heat a refrigerant with the heat generated in the electric motor 23. Especially, the loss in the core of the electric motor 23 can be increased by increasing the d-axis current value Id. At this time, the torque generated in the electric motor 23 by the d-axis current and the q-axis current is constant and thus the rotation speed of the electric motor 23 is stable. This prevents the production of unnecessary noise. Thus, the refrigerant can be quickly heated. More specifically, while a heating control is needed to heat the entire refrigerant in a case where an automobile air conditioner is operated as a heat pump or a hot gas heater, quick heating of the refrigerant allows the passenger compartment to start to be heated in a shorter period of time in the present embodiment.

The present disclosure is not limited to the above-described embodiment, but may be modified, for example, as follows.

Figure 8:
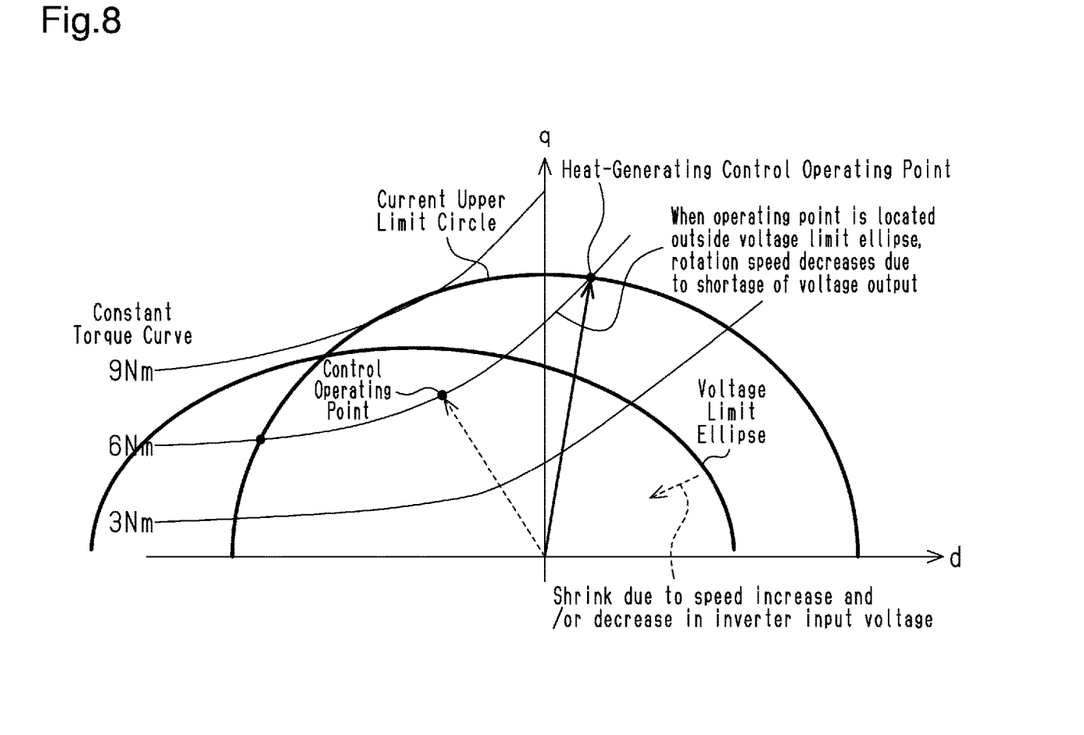
FIG. 8 is a diagram illustrating the control current vector.

As shown in FIG. 8, the operating point needs to be located inside the current upper limit circle and inside a voltage limit ellipse. The current upper limit circle is dependent on the rated current of the inverter (motor), and the voltage limit ellipse is dependent on input voltage and rotation speed. In order to perform operation according to a command rotation speed, the current vector to be selected needs to be located inside these two limit circles. Thus, when a decrease in the input voltage and/or an increase in the command rotation speed shrinks the voltage limit ellipse in a case where the operating point is located outside the voltage limit ellipse, the rotation speed decreases due to the shortage of voltage output. Thus, the rotation speed cannot be maintained at the heat-generating control operating point.

Figure 9:
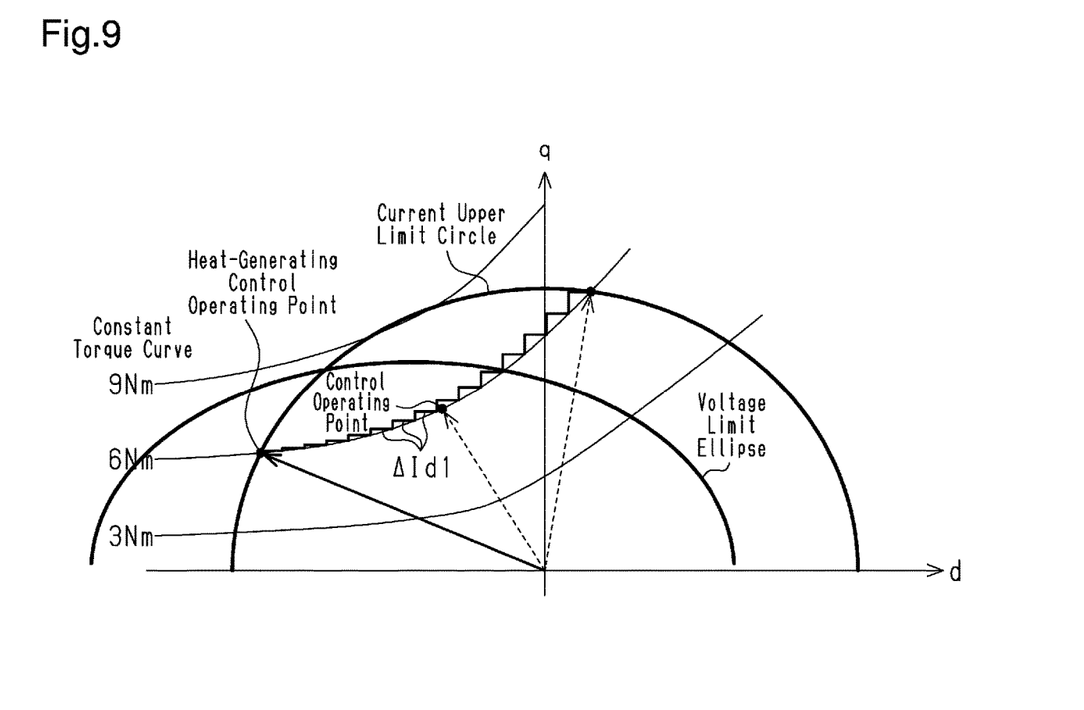
FIG. 9 is a diagram of the control current vector, illustrating shifts of heat-generating current increase.

To cope with this problem, as shown in FIG. 9, when the difference between the command rotation speed and the estimated rotation speed (rotation speed estimated value) is greater than a threshold value due to the shortage of the input voltage, the heat-generating control operating point shifts from the strengthened field side to a weakened field side. Even on the weakened field side, the current amount on the heat-generating control operating point remains unchanged and thus the copper loss remains unchanged. This allows for the use of waste heat.

Figure 10:
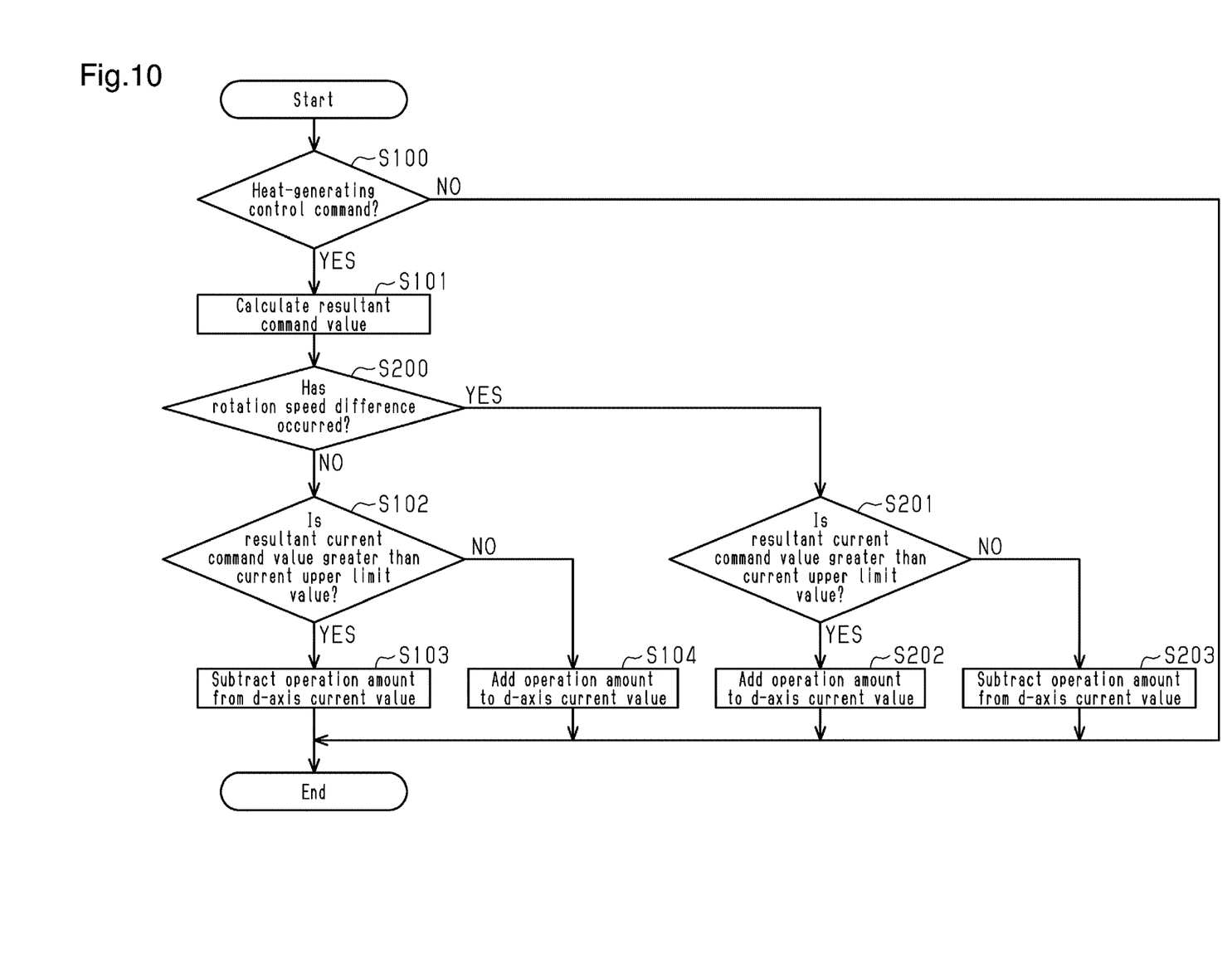
FIG. 10 is a flowchart illustrating the operation of the present embodiment.

More specifically, the heat-generating current command section 70 executes the processes shown in FIG. 10. In FIG. 10, step S200, step S201, step S202, and step S203 are added to FIG. 3.

In step S200 of FIG. 10, when the difference $\Delta\omega$ of the rotation speed is greater than or equal to a predetermined value, it is determined that the rotation speed difference has increased due to the shortage of the input voltage. Thus, for the heat-generating control operating point to shift to the weakened field side, the process is advanced to step S201. In step S201, it is determined whether the resultant current command value is greater than the current upper limit value. When the resultant current command value is not greater than the current upper limit value, the operation amount is subtracted from the d-axis current value in step S203. When the resultant current command value is greater than the current upper limit value, the operation amount is added to the d-axis current value in step S202.

Thus, the heat-generating current command section 70 changes the d-axis current command value Id* and the q-axis current command value Iq* so as to shift them in a direction in which the d-axis current value Id decreases along the constant torque curve when the difference $\Delta\omega$ between the rotation speed command value $\omega^*$ and the estimated rotation speed $\omega$ (rotation speed estimated value) is greater than the threshold value. Accordingly, even when the voltage limit ellipse shrinks due to a decrease in the input voltage or an increase in the command rotation speed, shifting to the control operating point on the weakened field side causes the difference between the rotation speed command value and the estimated rotation speed (rotation speed estimated value) to become greater than the threshold value. In addition, when a limit occurs in the size of the current vector in the d-q coordinate system, the difference between the rotation speed command value and the estimated rotation speed (rotation speed estimated value) can be reduced by changing the d-axis current command value and the q-axis current command value so as to shift them in the direction in which the d-axis current value decreases along the constant torque curve, and the refrigerant can be heated using the heat generated in the electric motor through a control that increases the loss of the electric motor.

Figure 11:
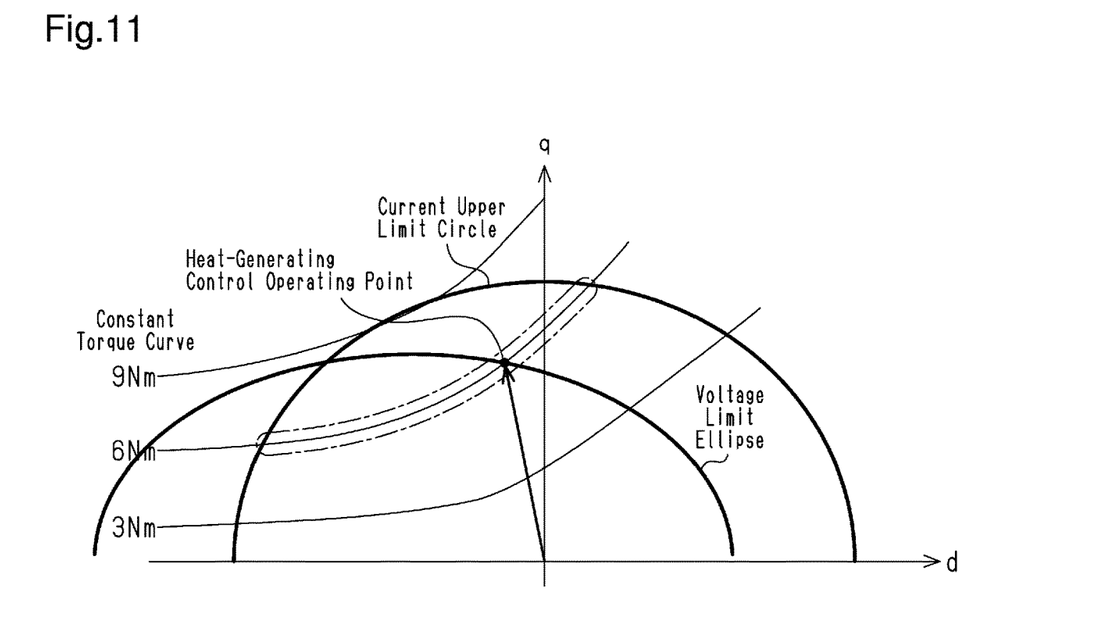
FIG. 11 is a diagram illustrating the control current vector.
Figure 12:
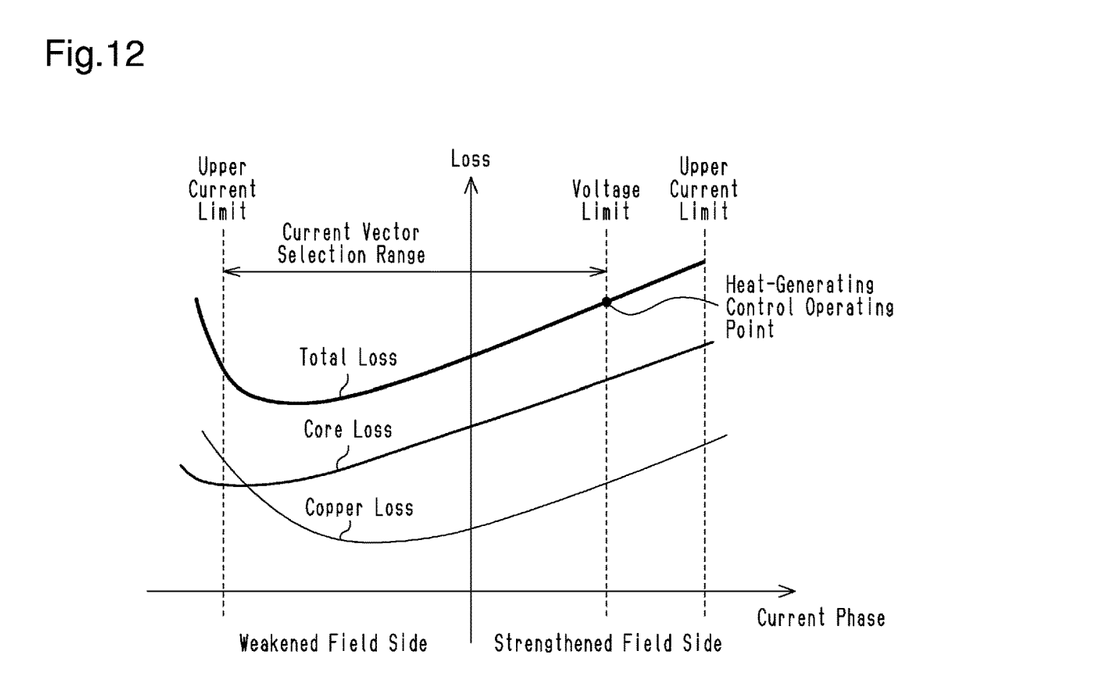
FIG. 12 is a chart showing a loss distribution on the constant torque curve.

At this time, as shown in FIG. 11, when the heat-generating control operating point is moved to the weakened field side as described above, the loss obtained in the core loss decreases. To cope with this problem, as shown in FIG. 12, in the case of a motor where the core loss accounts for a larger proportion of the total loss than the copper loss, the condition that the total loss is the maximum (the most strengthened side in the selection range of the current vector in FIG. 12) is set as the heat-generating control operating point. That is, as shown in FIG. 11, the heat-generating control operating point is set as the intersection point of the voltage limit ellipse and the constant torque curve.

Further, the above-described embodiment may be modified as follows.

Figure 13:
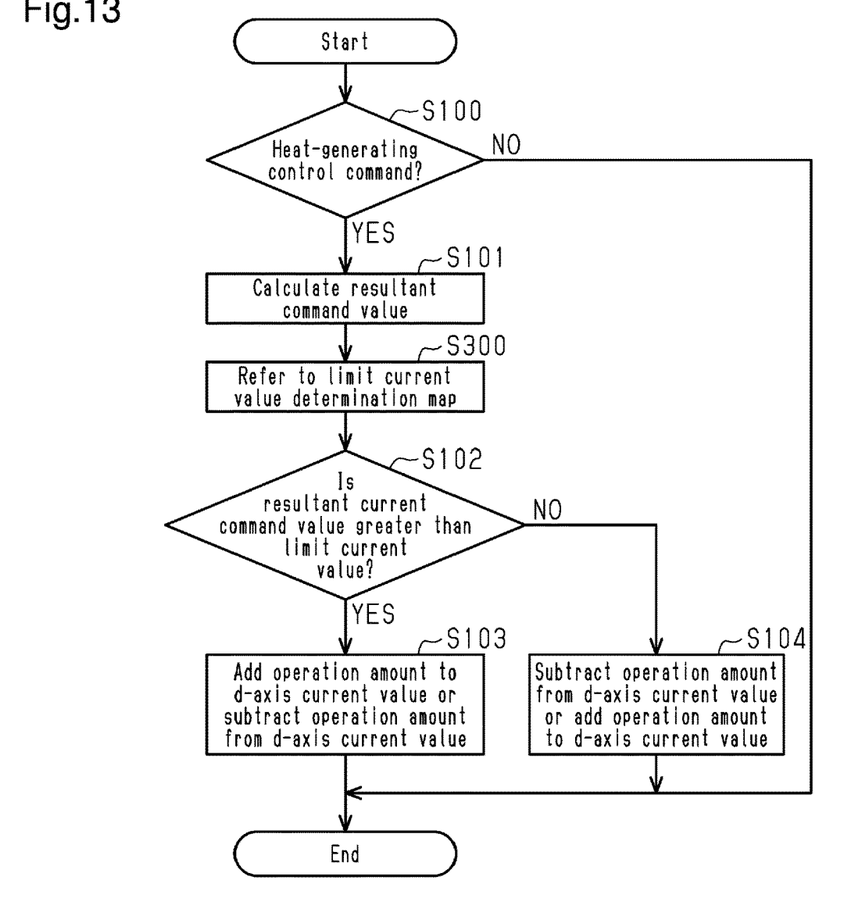
FIG. 13 is a flowchart illustrating the operation of another embodiment.

The heat-generating current command section 70 executes the processes shown in FIG. 13 to prevent the overheating of the switching elements Q1 to Q6, which are components of the inverter circuit 40. In FIG. 13, step S300 is added to FIG. 3.

Figure 14:
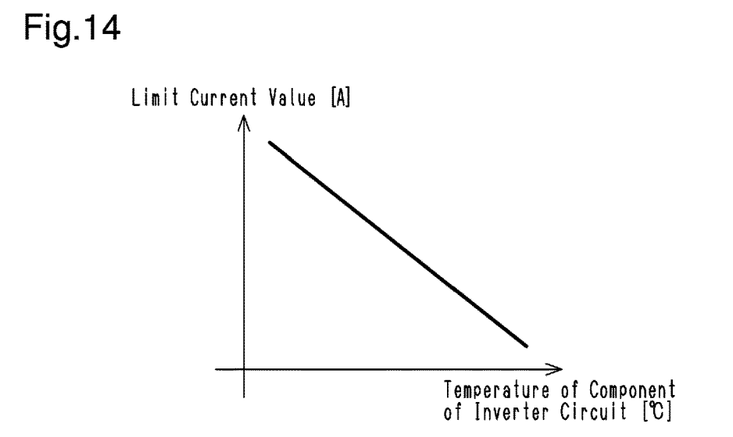
FIG. 14 is a graph showing a limit current value determination map.

In step S300 of FIG. 13, with reference to a limit current value determination map shown in FIG. 14, as the temperatures of the switching elements Q1 to Q6 (the components of the inverter circuit 40) become higher, the limit current value is set to be smaller and limited.

Figure 15:
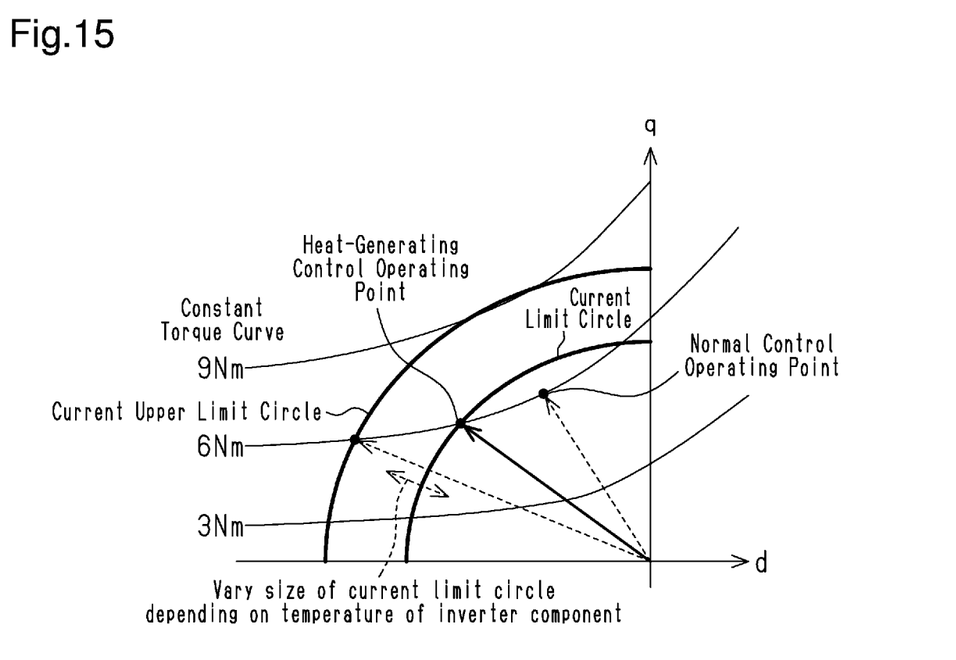
FIG. 15 is a chart showing a loss distribution on the constant torque curve.

As shown in FIG. 15, the size of the current limit circle is varied depending on the temperatures of the inverter components (i.e., the temperatures of the switching elements Q1 to Q6). More specifically, when the temperatures of the switching elements Q1 to Q6 (the components of the inverter circuit 40) increase, the size of the current limit circle is reduced so as to lower the current flowing through the electric motor.

Thus, as shown in FIG. 15, since the temperatures of the switching elements Q1 to Q6 (the components of the inverter circuit 40) may exceed their heat-resistance temperatures as the motor current increases, the heat-generating control can be continued by limiting the current corresponding to the component temperatures.

Thus, the heat-generating current command section 70 is configured to, in the d-q coordinate system, define the current upper limit circle in a range that is not greater than the limit current value for the temperature of the component of the inverter circuit 40 (for example, the temperatures of the switching elements Q1 to Q6) and change the d-axis current command value Id* and the q-axis current command value Iq* so as to shift them to the intersection point of the current upper limit circle and the constant torque curve. Accordingly, the overheating of the components of the inverter circuit 40 is prevented. This allows for the continuation of control with the generation of the d-axis current command value Id* and the q-axis current command value Iq* at the intersection point of the constant torque curve and the current upper limit circle in the heat-generating current command section 70.

Furthermore, the above-described embodiment may be modified as follows.

Figure 16:
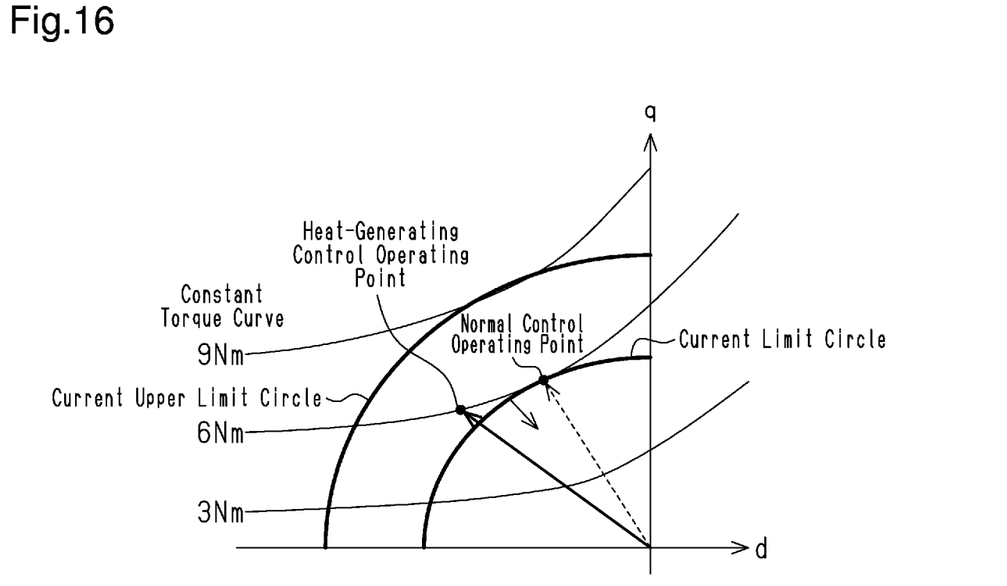
FIG. 16 is a diagram illustrating the control current vector.

In the above-described example, the current limit circle is reduced in size depending on the temperatures of the switching elements Q1 to Q6, which are the components of the inverter circuit 40. Instead, as shown in FIG. 16, if there is no intersecting point of the constant torque curve and the necessary torque (a normal control operating point in FIG. 16) due to a decrease in the current limit circle, a limitation is performed such that the rotation speed decreases and the load torque drops. Alternatively, a limitation is performed in order to maintain the rotation speed such that the current limit circle does not have an operating point less than or equal to the normal control operating point in FIG. 16.

Instead of a heat pump or a hot gas heater, a cooling air conditioning system may be used to quickly heat a refrigerant. Thus, it is effective to quickly vaporize a liquefied refrigerant in a reservoir in the refrigeration cycle by heating the refrigerant in the reservoir.

As another option, a system that switches between heating and cooling by causing a refrigerant to flow in the reverse direction in the refrigeration cycle may be used. This also allows the refrigerant to be quickly heated.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
an electric motor;
a housing that accommodates the electric motor and includes a suction port into which a refrigerant is drawn;
a compression portion configured to be driven by the electric motor and configured to draw in and compress the refrigerant in the housing; and
an inverter device configured to drive the electric motor, wherein
the inverter device includes
an inverter circuit including switching elements included in upper arms and lower arms of u-, v-, w-phases, the inverter circuit being configured to convert direct-current voltage into alternating-current voltage when switching operation for the switching elements is performed and supply the alternating-current voltage to the electric motor,
a current sensor configured to detect a value of current supplied to the electric motor,
a coordinate converter configured to calculate a d-axis current value and a q-axis current value using a detected value of the current sensor,
a speed controller configured to generate a d-axis current command value and a q-axis current command value using a difference between a rotation speed command value and a rotation speed estimated value for the electric motor,
a current controller configured to calculate a d-axis voltage command value using a difference between the d-axis current command value and the d-axis current value and calculate a q-axis voltage command value using a difference between the q-axis current command value and the q-axis current value,
a pulse-width-modulation controller configured to control the switching elements using the d-axis voltage command value and the q-axis voltage command value, and
a rotation speed estimator configured to calculate the rotation speed estimated value using the d-axis current value, the q-axis current value, the d-axis voltage command value, and the q-axis voltage command value,
the speed controller generates the d-axis current command value and the q-axis current command value such that necessary torque to drive the electric motor occurs,
the inverter device includes a heat-generating current command section configured to increase a temperature of the electric motor by changing the d-axis current command value and the q-axis current command value, and
the heat-generating current command section is configured to change the d-axis current command value and the q-axis current command value so as to shift the d-axis current command value and the q-axis current command value in a direction in which the d-axis current value increases along a constant torque curve in a d-q coordinate system.

2. The motor-driven compressor according to claim 1, wherein the heat-generating current command section is configured to change the d-axis current command value and the q-axis current command value so as to shift the d-axis current command value and the q-axis current command value in a direction in which the d-axis current value decreases along the constant torque curve when a difference between the rotation speed command value and the rotation speed estimated value is greater than a threshold value.

3. The motor-driven compressor according to claim 1, wherein the heat-generating current command section is configured to, in the d-q coordinate system, define a current upper limit circle in a range that is not greater than a limit current value for a temperature of a component of the inverter circuit and change the d-axis current command value and the q-axis current command value so as to shift the d-axis current command value and the q-axis current command value to an intersection point of the current upper limit circle and the constant torque curve.

\* \* \* \* \*